April 5, 1955         D. B. MILLER ET AL         2,705,613
APPARATUS FOR REPLACING GAS SERVICE PIPE
Filed April 10, 1952                              2 Sheets-Sheet 2
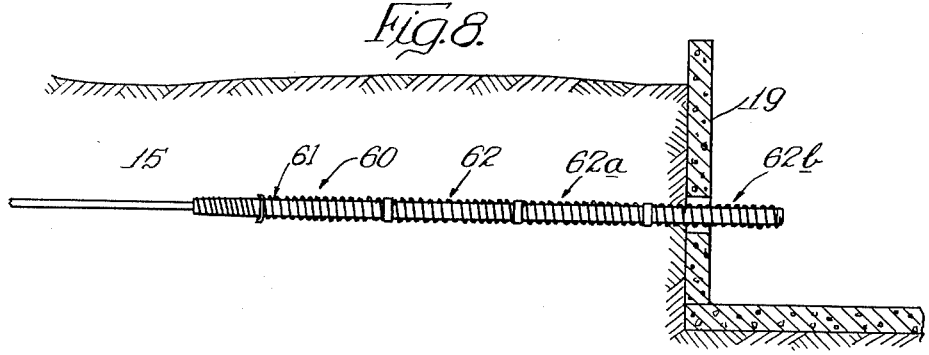
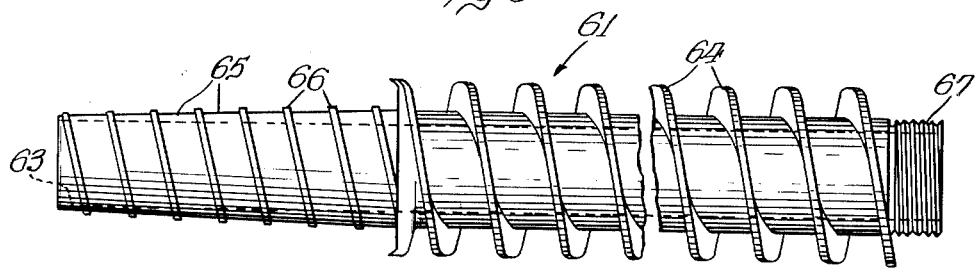
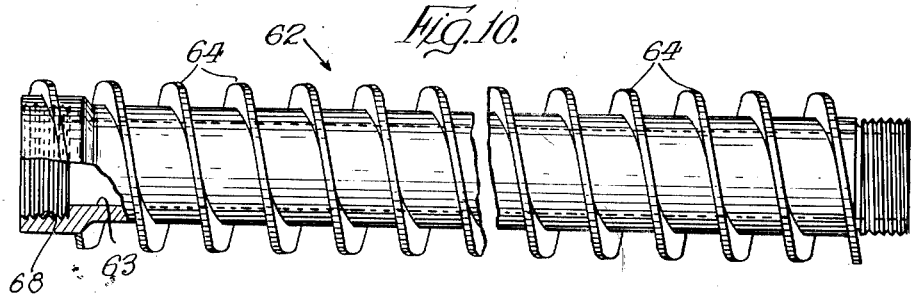

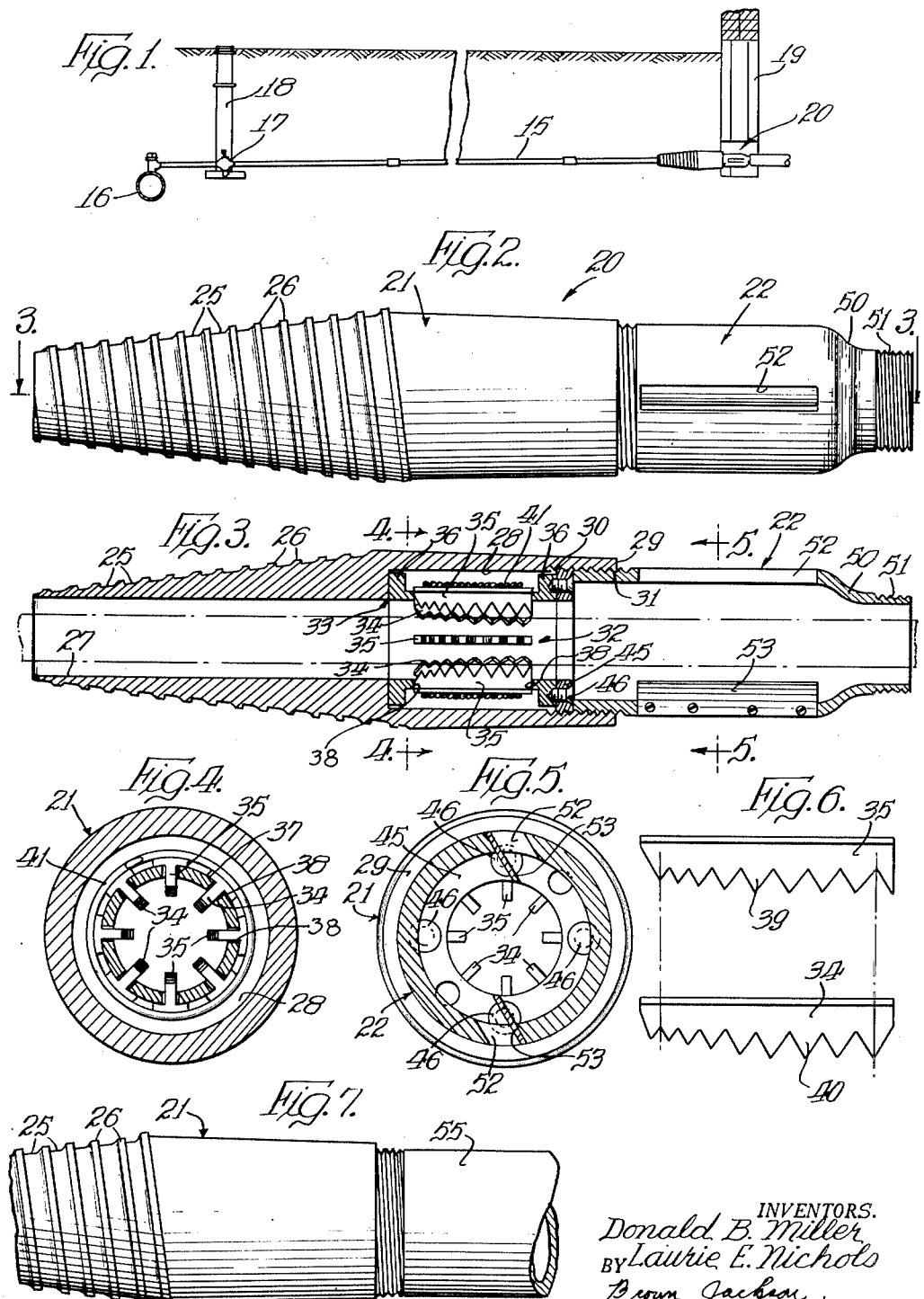

United States Patent Office 2,705,613
Patented Apr. 5, 1955

2,705,613

APPARATUS FOR REPLACING GAS SERVICE PIPE

Donald B. Miller, Wheaton, and Laurie E. Nichols, Oak Park, Ill.

Application April 10, 1952, Serial No. 281,692

12 Claims. (Cl. 255—20)

Our present invention relates generally to earth boring apparatus or means and more particularly to a new and improved means and method for quickly and efficiently dismantling and replacing buried gas service pipes or the like.

A gas service pipe may be defined as that facility which transports household gas, or the like, from the source of supply, which may be termed the "gas main" and which normally is located under the public street, alley, highway or easement, to the customer's premises or building, with the service line being normally terminated in the basement of such building at which point proper facilities for regulating and metering the flow of the gas are installed. Gas service pipes are usually of steel and installed in lengths joined together by threaded couplings or welded to form a continuous length of pipe. The service pipes may vary in size according to demand of gas required, but normally the size of pipe used for the average domestic service requirement is ¾" to 1½" depending on the pressure of the gas main from which it is supplied; such pressure varying from 60 pounds per square inch gravity or higher to 6 inches of manometer water column.

The replacement of gas service piping between the gas main and the customer's building is usually done for two reasons, namely, inadequate size or deterioration and leakage.

Normally the replacement for inadequate size is accomplished by uncovering or excavating the old service pipe, removing it and installing or replacing a pipe with sufficient diameter to supply the demand. Another method of replacement for inadequate size is to make an opening in the street or parkway at the main service tap or connection and by a pipejack or winch arrangement, pull the old service pipe out of the ground in short lengths at a time. In this method, if room is available from the customer's property, the new service pipe is attached to the old and is laid as the old pipe is removed. In some cases a reducer of a diameter larger than the new pipe to be installed is attached to the old pipe at the customer's end of the service pipe and thus a larger diameter hole is made as the old service pipe is pulled out so that the new pipe may then be pushed through the hole thus formed between the opening at the main and the customer's end of the service pipe.

The replacement of gas service pipe for reasons of leakage may be accomplished by the methods outlined above or, within limited sizes, by the insertion of a thin wall piping or tubing, of an outside diameter sufficiently less than the inside diameter of the present service pipe, through the old pipe; the tubing then acts as a casing between the supply main and the service end of the customer's property thus avoiding the need for undue excavation and fitting work, although such work is inherent with this method.

The replacement of gas service pipes by the insertion of tubing therewithin has now been limited in practice to 1½" and 1¼" steel service pipes, primarily due to capacity limitations of the decreased internal diameter caused by the insertion of the tubing within the service pipe. The replacement of 1" and ¾" steel service pipes by the tube insertion method is not too generally accepted due to the resulting inadequate capacity effected thereby and also because normally the internal or operating pressures of 1" and ¾" service pipes are in the pounds per square inch class and require a higher safety factor. This latter is especially true of the accepted term ¾" high pressure service pipe so that on the replacement of such ¾" service pipes for leakage reasons, it is necessary to entirely replace the same with the same or larger size (which is presently done by the first described methods hereabove).

However, in the majority of ¾" high pressure gas service pipe gas installations there is an underground valve installed for safety reasons, outside the consumer's building, so that in any method used to replace the service pipe without excavating the entire length or majority thereof, this valve has to be cut out of the line to allow movement of the old piping. In removing the valve, the service pipe is cut into two sections and unless the valve's location is coincidental with excavation requirements, quite a large excavation is necessary to move and reconnect the two pipe sections at this point for operation. Since such a method of replacement is quite costly, due to the large amount of excavation work, etc., it has become necessary that some method be devised for removal of the old service pipe with a minimum of excavation in an effort to retain the same location for the replacement pipe and to eliminate costs, caused by relocation changes. It is to just such a new and improved method and apparatus for accomplishing the same that the present invention is directed.

Briefly it may be stated that we have devised a new and improved earth boring or auger apparatus adapted to provide an entry opening around the circumference and along the length of the old service pipe whereby such may be removed readily by an easy pulling operation and readily replaced by inserting a new service pipe into the cylindrical bore which the old piping formerly occupied; all in a new and improved and less costly manner than is presently available.

It is the primary object of our invention to provide a new and improved apparatus for providing a clearance bore around a buried gas service pipe or the like while such remains in its buried condition thereby to afford ready removal and replacement of such buried service pipe with a minimum of excavation.

A further object of our invention is to disclose a new and improved manner or method of dismantling and replacing old service pipes while such remain buried, thereby eliminating the need for extensive excavation.

The above and further objects and features of our invention will be recognized by one cognizant with the art and especially with reference from time to time to the following specification and description of the accompanying drawings.

In the drawings:

Figure 1 is a schematic representation of a typical installation in which our present invention is adapted for use;

Figure 2 is an enlarged side elevational view illustrating the exterior appearance of a preferred form of our earth boring apparatus;

Figure 3 is a cross-sectional view taken substantially along the line 3—3 of Figure 2 and showing the internal arrangements of the several elements and mechanism contained in the earth boring apparatus illustrated in Figure 2 of the drawings;

Figure 4 is a cross-sectional view taken transversely of the apparatus illustrated in Figures 2 and 3 and along line 4—4 of Figure 3, looking in the direction of the arrows;

Figure 5 is a cross-sectional view similar to Figure 4 taken substantially along line 5—5 of Figure 3 and looking in the direction of the arrows;

Figure 6 is an enlarged partial side elevational view of the pipe cleaner elements contained within the body of the earth boring apparatus of Figures 2 and 3 and showing their operating relation with one another;

Figure 7 is a side elevational view, similar to Figure 2, illustrating a first modified form of our earth boring apparatus;

Figure 8 is a schematic view, similar to Figure 1, illustrating the typical installation and the use therein of a second modified form of our earth boring apparatus;

Figure 9 is a side elevational view, similar to Figure 2, showing the details of a pilot section of the modified form of earth boring apparatus illustrated in Figure 8; and Figure 10 is another side elevational view similar to Figure 9 showing an afterbody section of the earth boring apparatus attachable to the pilot section as illustrated in Figure 8 of the drawings.

With particular regard to Figures 1 through 6 of the drawings, it will be recognized that the preferred form of our invention illustrated therein is for use in a typical buried or underground service pipe installation according to Figure 1. As noted from Figure 1, a typical service pipe installation includes varied lengths of service pipe 15 which, for purposes of present illustration, shall be considered in the order of from ¾" to 1½" piping. One end of the service piping 15 is to be threadingly joined or connected to a supply main 16, usually located beneath the roadway in front of the residence or under the sidewalk, etc., with the flow of gas from the supply main through the service pipe normally being interrupted by an intervening underground shut-off valve 17 operable from the surface of the ground via a substantially vertically positioned valve or buffalo box 18. The opposite end of the service pipe 15 is, of course, extended through a wall 19 of the residence being serviced and it is this end or the inner end of the service pipe over which our new and improved earth boring apparatus, indicated generally by numeral 20, is fitted preparatory to initiating its operation.

As will be recognized from Figures 2 and 3 of the drawings in particular, the ground boring apparatus 20 of our invention comprises a pilot sleeve section 21 interfitted by threading engagement with an afterbody section 22.

The pilot sleeve section 21 comprises generally a tubular body member made of cold roll steel, or the like, which is suitably tapered adjacent its forward or leading end to provide a conical nose section 25. The exterior surface of the conical tapered section 25 is provided with a stump or cutoff screw thread 26 arranged auger-like along its exterior to provided a means for dislodging tightly packed earth encountered around the buried service pipe 15 as our earth boring apparatus proceeds therealong in a manner to appear presently. It further will be appreciated that the pilot section 21 is provided with a central circular internal bore 27 of a size sufficient ot accommodate the outside diameter of the service pipe and any pipe unions therealong. Bore 27, as illustrated, also reaches or communicates with the forward end of the tapered pilot section 25 and extends rearwardly into an enlarged internal bore 28 which communicates with the rearward end 29 of the pilot section. Suitable threads 30 are provided adjacent the rearward end of the internal bore 28 for connection with a threaded forward end 31 of the afterbody section 22, whereby the afterbody section may be mounted coaxially with the pilot section, as illustrated clearly in Figure 3 of the drawings. It will also be understood that the internal bore 28, formed at the after end of the pilot section, contains a pipe cleaning apparatus indicated generally by a numeral 32 which comprises a pipe cleaner carriage 33 and a plurality of pipe cleaner segments 34 and 35.

As best shown in Figures 3 and 4 of the drawings, the pipe cleaner carriage 33 consists of a cylindrical or tubular cage member made of cold roll steel or the like, which is provided with circular flanged ends 36—36 having a diameter substantially identical to the diameter of the internal bore 28 whereby the pipe cleaner carriage may be insertedly received in a close fitting relation within the bore 28. Further, it will be appreciated that the length of the substantially tubular pipe cleaner carriage is of a dimension sufficient to reach from the forward end of the bore 28 to the rearwardly disposed internal threads 30 thereof. The cylindrical body portion 37 of the pipe cleaner carriage member 33 is provided with a plurality of symmetrically spaced longitudinal slotted openings 38—38 in which are fitted the pipe cleaner segments 34 and 35, illustrated in Figure 6 of the drawings. With reference to Figure 6, it will be appreciated that the segments 34 and 35 are substantially identical with the exception of the arrangement of the teeth elements 39 and 40 thereof, respectively. The segments, as illustrated, constitute elongated rectangular bars across the lower edge of which are arranged a plurality of coarse teeth 39 and 40, as the case may be, which taper radially inwardly and rearwardly from the leading end of the pipe cleaner segments. The line of teeth 40 of the segment members 35 are arranged in staggered relation as opposed to the line of teeth 39 of the segment members 34, that is, the teeth 39 and 40 are offset angularly and longitudinally with respect to each other. Consequently, when such segments are arranged in adjacent relation in the symmetrically disposed or spaced slotted openings 38 of the pipe cleaner carriage member 33, an effective means is provided for scraping the exterior of the service pipe 15 as our earth boring apparatus is moved therealong. It will also be seen from Figure 4, that the pipe cleaner carriage member 33 is provided with eight of the longitudinal slotted openings 38 and that the segment members 34 and 35 are arranged in alternate adjacent relation and held in their respective slotted openings by means of a common coil spring member 41 which surrounds the cylindrical body portion 37 of the pipe cleaner carriage member. Other resilient means than the coil spring member 41 might be employed.

To insure against rotational movement of the pipe cleaner carriage member 33 in its mounted disposition within bore 28, a circular or annular collar block 45 is threadingly mounted adjacent the rearward end of the pipe cleaner carriage and in mating engagement with the internal threads 30 of the pilot section 21. Locking engagement between the lock collar 45 and the rearwardly disposed flange 36 of the pipe cleaner carriage is accomplished by a plurality of threaded screw members 46, substantially as illustrated in Figure 3 of the drawings.

The afterbody section 22 comprises a substantially cylindrical member having the pipe threads 31 formed at its forward end for mating engagement with the internally disposed threads 30 at the rearward end of the pilot section as heretofore described. The afterbody is further distinguished by necked-down portion 50 at its rearward end. This necked-down portion 50 reduces from the larger external diameter of the afterbody necessary for threading accommodation with the diameter of the pilot section bore 28 to a smaller diameter appropriate, nevertheless, to provide internal clearance or passageway to the service pipe and unions thereon coaxially through the afterbody. The exterior of the neck-down portion 50 is provided with pipe threads 51 which may be in the order of 1½" standard pipe threads. The afterbody section is further provided with a pair of longitudinal slotted openings 52 which are cut at an angle through the side walls thereof, as seen in cross section from Figure 5 of the drawings. Scraper plates 53 are rigidly secured, one in each of the angularly disposed slotted openings 52, as best shown in Figure 5 of the drawings, to contact the external surface of any pipe unions along the service pipe as the same passes therepast, for the purposes of cleaning encrusting matter normally present thereon in a manner which will be described presently. The angular dispostion of the scraping plates 53 is also such as to force any material removed from the exterior of the service pipe by the cleaner segments 34 and 35 outwardly through the angularly disposed slotted openings 52 in the afterbody section to discharge the same externally of our earth boring apparatus 20.

Due to the fixed relation or positioning of the blade member 53, their inward radial extent is substantially equivalent to the outward radial diameter which can be assumed by the movable pipe cleaner segments 34 and 35. Therefore, the blades only function as scrapers when a larger diameter union coupling passes therebetween, but at other times such serve as a gathering means for assisting the ready removal of the material dislodged from the surface of the service pipe by the cleaner segments within the pilot section 21.

It will also be recognized, as illustrated in Figure 7 of the drawings, that the pilot section 21 may be connected directly to a section of drive piping 55 without attaching the afterbody section 22 thereto, if preferred. This latter combination may be more adaptable for certain situations where the use of the afterbody section 22, having the reduced neck portion 50 as heretofore described, is not desirable, such an instance might occur where the ground or aggregate about the service pipe is of a loose nature and the removal of the crusting material on the surface of the service pipe need not be effected by the scraper blade members 53 of the afterbody; or where numerous unions of adjacent sections of the service pipe having diameters greater than the afterbody can pass therethrough are likely to be encountered.

When the pilot section 21 is utilized as illustrated in Figure 7 of the drawings, the internal pipe cleaning means, as illustrated in Figure 3 of the drawings, is retained, but the afterbody section 22 is eliminated as illustrated.

Turning now to Figures 8, 9 and 10 of the drawings it will be recognized that we have illustrated therein a modified form of earth boring apparatus 60 which comprises essentially a pilot lead section 61 and an afterbody section 62 composed of tubular members adapted to receive the service line 15 coaxially therethrough by means of their axial openings 63, as with the apparatus 20 heretofore described. It will be appreciated, however, that in the apparatus 60 of Figures 8, 9 and 10 that the internal pipe cleaning means 32, described before, has been eliminated and that the exteriors of the tubular pilot and afterbody sections thereof are provided with extended continuous helical auger threads 64 which aid materially in driving the earth boring equipment through the earth about the service pipe. This modified apparatus 60 is particularly adapted for use in situations where hard packed earth or aggregate are encountered about the service pipe, as will be recognized presently. Also the pilot section 61 is again provided with a tapered portion 65 having external foreshortened or stump screw threads 66, as in the preferred embodiment 20 of our invention heretofore described; such tapered portion 65 serving as a means for easing the opening of an entry about the service pipe due to its gradual rearward inclination. The after end of the pilot section 61 is also provided with external threads 67 for threading engagement with the forward internally threaded end 68 of an afterbody section 62, thereby to compose a composite auger or earth boring mechanism which may, if desired, include additional afterbody sections 62a and 62b etc., instead of driving pipe sections as used in the primary form 20 of our invention. To assist in ready detachment of the several auger sections, the threads therebetween are of a coarse nature to afford a loose fit.

Use and method of operation

As stated heretofore the normal practice, before our invention, in replacing a service line or pipe (for instance ¾" high pressure service line with the same size pipe) involved either a complete excavation of the old pipe or a partial excavation at the junction of the service line with the supply main and the use of a jack or winch arrangement to pull the old pipe out in short lengths. If possible, under the last mentioned method, the new pipe was attached to the inner end of the old service pipe so the new pipe would be drawn into the underground opening formerly occupied by the old service pipe as the latter was withdrawn.

Under our present invention and especially with reference to the preferred embodiment 20 of our invention illustrated in Figures 1 through 7 of the drawings, replacement of, for instance a ¾" high pressure service pipe, with the same size pipe takes place somewhat as follows:

Since the service pipe is connected to the main, it is normally necessary to make an excavation at that point and disconnect the service pipe from the supply main. If a buffalo or valve box is also included in between the supply main and the residence, it is necessary normally to make an excavation at that point to disconnect the valve from the service line, usually removing such valve. The foundation wall of the residence is then broken away adjacent the inner end of the service line and earth boring apparatus of the type illustrated in Figures 2 and 3, in particular, fitted over the old service pipe which is received coaxially through the hollow central opening thereof. The intention of use for our apparatus is to drive the same along the old service pipe, which acts as a piloting means therefor to direct its course underground, by rotating the apparatus and applying pushing force at the same time. Thus an annular excavation is made around the old service pipe which may then be removed and replaced readily. In the preferred mode of operating our apparatus, we utilize short sections of drive pipes 55 which are threaded at one end over the threads 51 of the reduced neck portion 50 on the afterbody section of our earth boring apparatus 20. Or, to eliminate the afterbody portion 22 of the apparatus 20, such drive pipes may be of a diameter equivalent to the afterbody portion 22 so that such may be threadingly connected directly to the pilot section 21, as illustrated in Figure 7. The opposite or inner end of the drive pipe section is then coupled to an air motor adapted to rotate the same, with the air motor being carried on a framework which has a track adapting the motor for movement towards and away from the foundation wall. The motor is then worked toward the wall, at the same time it rotatably drives the drive pipe section and the earth boring apparatus, by means of a lever which engages successive notches disposed along the track thereof (the motor, track and lever not being illustrated herein but being of a conventional known design). After one section of the push pipe is substantially driven through the foundation wall to its full length thereby moving the earth boring apparatus along the length and providing an annular passageway about the old service line, the air motor is disconnected from the pushpipe and additional length or section of the push pipe is threaded onto the first driven section of push pipe and coupled to the air motor which again drives the second section of push pipe and earth boring apparatus along the old service line. In this respect a better visualization may be encountered if it is realized that our earth boring apparatus and the push pipe sections receive the old service line coaxially through their hollow center so as to be rotatably driven concentrically thereabout during operation. The program of driving the length of push pipe along the old service line and connecting additional lengths of push pipe to the driven section and the air motor is repeated until the apparatus of our invention arrives at the point of junction of the old service line with the supply main.

It will be appreciated that in passing through the area formerly occupied by the shut-off valve 17, it is necessary that our apparatus bridge the gap and be piloted on to the succeeding section of the old service line so that it and the attached push pipe sections may proceed to the supply main. Although we have specified hereabove that the push pipes are to be used in pushing and driving the earth boring apparatus along the old service line it is also possible, but not preferable, that the new pipe line, if such is to be of a greater diameter than the old line, may be substituted for the push pipe and thereby be laid at the same time it drives the earth boring apparatus. However, we have found in practice that normally space limitation and possible damage to the new section of service line dictates that it is preferable to use sections of push pipe in driving our apparatus rather than utilizing the new service line for that purpose. It will be appreciated that having once driven the earth boring apparatus of our invention to the supply main the sections of push pipe are then pulled to the rear or inwardly into the basement of the residence to remove our apparatus and section of push pipe from the annular hole bored about the old service line which may be withdrawn with our apparatus or separately as desired. Since the pilot section 21 of our invention carries therewith the internal pipe cleaning mechanism 32, as described heretofore, it will be appreciated that upon completion of driving the entry about the old service line the latter exists in a rather clean state so that its withdrawal from the ground and into the residence is rather easily accomplished. Having once removed the old service line the new line may be inserted readily in the opening left thereby.

In operating our modified form of earth auger as illustrated in Figures 8 through 10 of the drawing, again an air motor, track and lever is used to rotatably drive the same about the old service line with succeeding afterbody sections, such as section 62, being attached to the previously driven sections to form a continuous auger as illustrated in particular in Figure 8 of the drawings.

Or if desired, short sections of push pipe may again be utilized to drive this modified style of earth auger thereby to open an annular entry way about the old service line. It will be appreciated that while the modified apparatus 60, as illustrated herein, is not the preferred form of our invention and does not embody the internal pipe cleaning means as described in form 20 of our invention, nevertheless such includes a means for driving externally about a buried service line thereby to make a radial opening thereabout. Also, due to the extended auger thread 64 of this modified form, such tends to drag or drive itself through the earth more readily when rotated, as contrasted to the necessary pushing needed with apparatus 20.

Thus it will be appreciated that we have described the features of new and improved earth boring apparatus and a method for removing and replacing service pipe and gas service line pipe in particular, whereby a new, improved and convenient expedient for replacing buried and defective service line piping is afforded without the necessity of complete excavation or a complex jack or winch arrangement as was heretofore the practice. Further, while we have herein shown and described several forms in which the features of our invention may occur, it will be appreciated that numerous changes, modifications and substitutions of equivalents may be made therein without departing from the spirit and scope of our invention. Therefore, we do not wish to be limited to the specific embodiments of our invention herein illustrated and described, except as may appear in the following appended claims.

We claim:

1. For use in opening an entry about a buried service pipe or the like, a tubular member open at both ends and adapted to receive the said buried service pipe coaxially therethrough, a continuous helical thread means on the exterior of said tubular member for threadingly engaging earth tightly packed aout the said buried service pipe, means within said tubular member for cleaning the exterior of said service pipe as such tubular member is advanced therealong, and extensible drive means coaxially attachable to one end of said tubular member and receiving said service pipe coaxially therethrough for rotatably advancing said tubular member along said pipe to form an annular opening thereabout thus permitting the ready withdrawal of said buried piping from said opening without the need of excavation.

2. Earth boring apparatus of the class described for use in driving an opening around buried service piping or the like, comprising in combination, a tubular member having an axial opening for receiving the said buried piping coaxially therethrough, with the piping serving as a guide means for directing the course of the apparatus; a tapered tubular pilot portion detachably connected coaxially to one end of said tubular member and adapted to receive the said piping coaxially therethrough, a continuous helical thread disposed along the exterior of said pilot portion, whereby rotational driving of said apparatus about said piping serves to advance the same therealong to open an annular entry radially outward of said piping, and means within said pilot portion for cleaning the exterior of said service piping as said pilot portion is advanced therealong.

3. For use in opening an entry radially outward of an underground buried service pipe or the like, an earth boring apparatus, comprising, a tubular pilot member open at both ends and adapted to receive the said buried service piping coaxially therethrough, a conical tapered head portion on said pilot member, a continuous helical, ground engaging thread formed on the exterior of said head portion, an afterbody member coaxially attachable to the rearward end of said pilot member, extensible tubular drive means attachable coaxially to the after end of said afterbody member and adapted to receive said buried service piping coaxially therethrough and rotatably drive said pilot and afterbody member concentrically about said service pipe, means within said pilot member for cleaning the exterior of said service pipe as the latter passes therethrough, and means within said afterbody member for catching the material cleaned from said service pipe and moving the same outwardly of said afterbody member.

4. In earth boring apparatus of the class described for use in the replacement of underground piping, a tapered tubular pilot section adapted to receive the said piping coaxially therethrough, a continuous helical thread extending radially outward of said pilot section, a plurality of radially extending cleaner segments housed internally of said pilot section, spring means concentrically surrounding said segments for biasing the same radially inward, said segments being adapted to contact the exterior of said piping and clean the same as said pilot section is rotatably driven along said piping, and tubular extensible driving means attachable coaxially to the rearward end of said pilot section and concentrically about said piping, said driving means being driven rotatably and imparting advancing thrust to said pilot section for moving the same rotatably along said piping thereby to open an annular entry radially therearound.

5. In an apparatus of the class described for use in the removal and replacement of buried service piping or the like, the combination comprising, a tubular pilot section having a rearwardly tapered head portion adapted to receive said buried piping coaxially therethrough, a plurality of radially disposed pipe cleaner segments carried within said pilot section for cleaning the exterior of said piping as said pilot section is advanced rotatably therealong, spring means concentrically surrounding said cleaner segments for resiliently biasing the same radially inward, a tubular afterbody section attachable coaxially to the rearward end of said pilot section, said afterbody section having a plurality of longitudinal slotted apertures therein, and a plurality of scraper blades disposed within said afterbody section, one extending angularly inward of each of said openings thereof for engaging the material cleaned from said piping by said pipe cleaner segments and removing the same from the interior of said afterbody section.

6. In an apparatus of the class described adapted to be rotatably driven and advanced along a buried service pipe for opening an annular opening thereabout, the combination comprising, a tubular pilot section having a conical tapered forward end adapted to wedge earth tightly packed about said buried service piping radially outward therefrom, pipe cleaner means carried within said pilot section for cleaning the exterior surface of said piping as said pilot section is advanced therealong, a tubular afterbody section coaxially attachable to one end of said pilot section, means within said afterbody section for engaging the material scraped from the surface of said piping by said cleaner means and moving the same to the exterior of said afterbody section, and means at the rearward end of said afterbody section for attachment with an extensible tubular driving member adapted to rotatably advance said apparatus along said piping.

7. Earth boring apparatus comprising a tubular member open at both ends and adapted to receive a buried service pipe coaxially therethrough, helical thread means on the exterior of said tubular member for threadingly engaging earth surrounding said buried service pipe, and pipe cleaner means internally of said tubular member adapted to contact the exterior of said pipe and clean the same as said tubular member is moved along said service pipe as a guide.

8. Earth boring apparatus comprising a tubular member open at both ends and adapted to receive a buried service pipe coaxially therethrough, helical thread means on the exterior of said tubular member for threadingly engaging earth surrounding said buried service pipe, and pipe cleaner means internally of said tubular member adapted to contact the exterior of said pipe and clean the same as said tubular member is moved along said service pipe as a guide, said pipe cleaner means being radially yieldable within said tubular member to accommodate the passage through said pipe cleaner means of pipe couplings in said service pipe.

9. The apparatus of claim 8 wherein the pipe cleaner means comprises a plurality of radially extending members resiliently urged radially inwardly toward said service pipe.

10. The apparatus of claim 8 wherein the pipe cleaner means comprises radially extending teeth offset angularly and longitudinally with respect to each other.

11. The apparatus of claim 10 wherein there are lines of teeth extending longitudinally of the tubular member with the lines being angularly offset and with the teeth of each line tapering radially inwardly and rearwardly from the leading end of the line.

12. The apparatus of claim 11 wherein the lines of teeth are supported in spaced relation by a cylindrical slotted carriage member with the lines of teeth extending radially inwardly through the slots and having a flanged head portion bearing on the exterior of said carriage to limit radial inward movement, and concentric spring means resiliently bearing on said flanged head portions.

References Cited in the file of this patent

UNITED STATES PATENTS

| | | |
|---|---|---|
| 293,271 | Philips et al. | Feb. 12, 1884 |
| 369,545 | Monroe et al. | Sept. 6, 1887 |
| 662,646 | Hardsocg | Nov. 27, 1900 |
| 1,521,596 | Casey | Jan. 6, 1925 |
| 1,740,761 | Berry | Dec. 24, 1929 |
| 2,244,202 | Johnson | June 3, 1941 |